United States Patent [19]
Meneely et al.

[11] 3,986,139
[45] Oct. 12, 1976

[54] RADIOACTIVELY PREIONIZED ELECTRICAL DISCHARGE LASER

[75] Inventors: Clinton T. Meneely, Westford; Howard Schlossberg, Lexington, both of Mass.

[73] Assignee: The United States of America as represented by the Secretary of the Air Force, Washington, D.C.

[22] Filed: Feb. 18, 1975

[21] Appl. No.: 550,781

[52] U.S. Cl. .................... 331/94.5 P; 331/94.5 G; 330/4.3
[51] Int. Cl.² ................... H01S 3/09; H01S 3/22
[58] Field of Search ............... 331/94.5 G, 94.5 PB, 331/94.5 P; 330/4.3

[56] References Cited
UNITED STATES PATENTS
3,772,608  11/1973  Gleason ...................... 331/94.5 P OTHER PUBLICATIONS
Denes et al., J. Applied Physics, vol. 44, No. 9, Sept. 1973, pp. 4125–4136.
Nucleonics, vol. 19, No. 2, Feb. 1961, p. 70.

Primary Examiner—Robert J. Webster
Attorney, Agent, or Firm—Joseph E. Rusz; Jacob N. Erlich

[57] ABSTRACT

A miniature TEA laser system having a pair of electrodes mounted within the laser cavity and a radioactive source in the form of a beta particle emitter located within the cavity adjacent the electrodes. The electrodes are spaced no more than the maximum beta particle range apart so that the radioactive emission can take place within the space between electrodes thereby uniformly preionizing the active laser medium within the cavity.

2 Claims, 2 Drawing Figures

RADIOACTIVELY PREIONIZED ELECTRICAL DISCHARGE LASER

STATEMENT OF GOVERNMENT INTEREST

The invention described herein may be manufactured and used by or for the Government for governmental purposes without the payment of any royalty thereon.

BACKGROUND OF THE INVENTION

This invention relates generally to lasers, and, more particularly, to a waveguide-type TEA laser which incorporates therein a radioactive source for preionization of the gases contained within the laser cavity.

Lasers find use in a wide diversity of activities ranging from communication over great distances to the drilling of very accurate holes in objects.

Most lasers consist of a column of active material having a partly reflecting mirror at one end and a fully reflecting mirror at the other. The laser is primed by pumping the atoms of the active material, by means of a flash of intense light, to an excited state. With a preponderance of atoms in that state the system can be stimulated to produce a cascade of photons, all the same wavelength and all in step, by triggering the emission of energy that drops the atoms from the excited state to a lower energy state. A photon carrying this quantum of energy, on striking an excited atom, causes it to emit a photon at the same frequency, and the light wave thus released falls in step with the triggering one. Waves that travel to the sides of the column leave the system, but those that go to the ends of the column along its axis are reflected back and forth by the mirrors. The column, whose length is a whole number of wavelengths at the selected frequency, acts as a cavity resonator, and a beam of monochromatic, coherent light rapidly builds in intensity as one atom after another is stimulated to emit photons with the same energy and direction. After the laser light has built up in this way it emerges through the partly reflecting mirror at one end of the column as an intense highly directional beam.

The active medium of the conventional $CO_2$ laser is an electrically excited mixture of carbon dioxide, nitrogen and helium. Uniform excitation of the gas mixture at atmospheric pressure, however, is not readily achieved. As the pressure is increased in the conventional low-pressure glow discharge, the characteristics of the discharge change, and at about 200 torr the glow constricts to an arc.

In some instances, a glow discharge can be maintained in the gas by making the discharge time short compared to the arc formation time or by limiting the discharge current density below that required for the formation of a constricted arc. It has been found that for a $l-m$ discharge length at atmospheric pressure, voltages in the neighborhood of $10^6$ volts are required for proper excitation of $CO_2$ lasers. To meet the requirement of a short discharge time and to lessen the requirement for such extremely high applied voltages, scientists used pulsed transverse excitation, that is, a discharge that is transverse rather than parallel to the optic axis. These transverse excited atmospheric pressure lasers are called TEA lasers.

Various methods of preionization are used in TEA-type lasers to obtain larger volumes of gas discharge and thus more energy. Preionization refers to the presence of charged particles in the gas volume prior to initiation of the discharge. These charges aid in the initiation of a large volume glow discharge of high spatial uniformity. A high-pressure pulsed molecular laser based on a discharge scheme involving preionization of the discharge volume with the aid of an auxiliary discharge from a third electrode, has been designated a double-discharge TEA laser.

One such double-discharge TEA $CO_2$ laser system uses volume photoionization of the gases by ultraviolet radiation emitted from multiple spark discharges. In this approach, energy is supplied to the $CO_2$—$N_2$—He gas mixture by a discharge occurring between a solid cathode and a mesh anode.

The problem with the past methods of preionization by ultraviolet photoionization and/or preliminary arc discharges are many. For example, a. these systems incorporate therein complex electrical apparatus and timing circuits;
b. they produce a non-uniform preionization which yields a non-uniform excitation;
c. "streamers" and/or arcs may form in the laser cavity;
d. rapid degeneration of the electrodes takes place;
e. hot spots may form in the laser along with distortion of the laser cavity; and
f. the lasing acting may not take place at all.

SUMMARY OF THE INVENTION

The instant invention sets forth an extremely small or waveguide Transverse Excitation Atmospheric (TEA) laser which incorporates therein a radioactive source (preferably a pure Beta emitter) to provide a partial ionization of the active gas medium in the electrode area in order to provide a uniform preionization and therefore overcome the problems heretofore encountered and enumerated hereinabove. This partial ionization promotes a glow discharge operation of such TEA lasers without arcing or streamers which cause electrode damage and laser inefficiencies. The preionization procedure of this invention would be especially well suited for high reliability, low power consumption lasers such as required space qualified laser units. In addition it could be used in electrically initiated chemical combustion lasers to provide the uniform volumetric preionization necessary for efficient operation.

It is therefore an object of this invention to provide a radioactively preionized electrical discharge laser which produces uniform preionization and therefore highly reliable and efficient lasing operation.

It is another object of this invention to provide a radioactively preionized electrical discharge laser which eliminates the need for complex electrical discharge equipment and timing circuits.

It is still another object of this invention to provide a radioactively preionized electrical discharge laser which is economical to produce and which utilizes conventional currently available components that lend themselves to standard mass producing manufacturing techniques.

For a better understanding of the present invention together with other and further objects thereof reference is made to the following description taken in conjunction with the accompanying drawing and its scope will be pointed out in the appended claims.

DETAILED DESCRIPTION OF THE PREFERRED EMBODIMENTS

Figure 1:
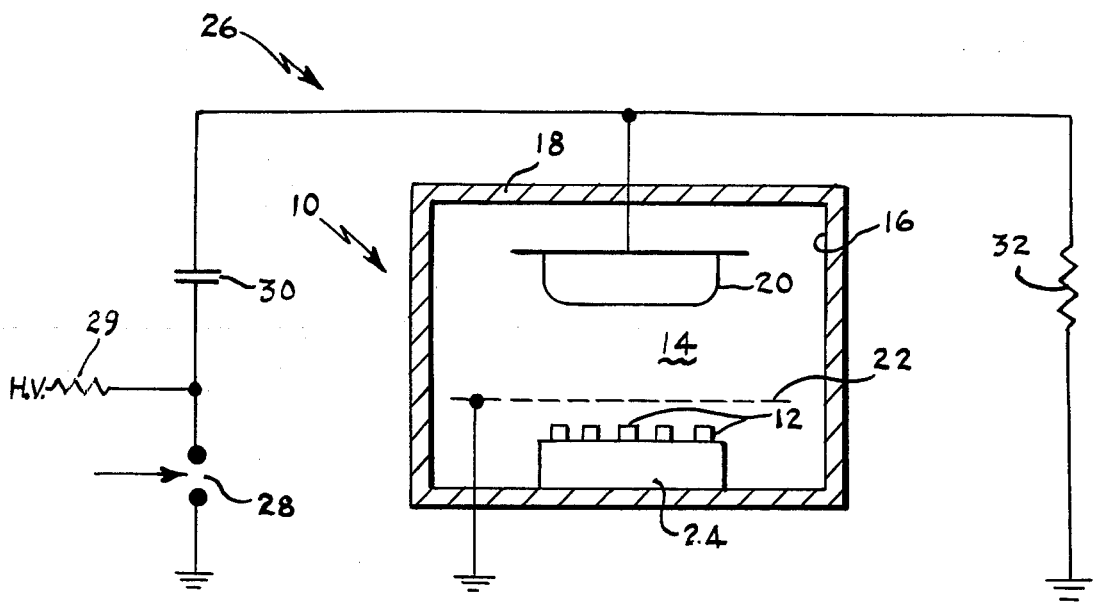
FIG. 1 is a schematic representation of the radioactively preionized electrical discharge laser system of this invention, showing an end view of the laser cavity partly in cross-section.

Reference is now made to FIG. 1 of the drawing which shows an end view of laser 10 of this invention. Laser 10 incorporates therein a radioactive source 12 for preionizing the active gases 14 within the laser cavity 16. This invention finds its main utility within a Transverse Excitation Atmospheric (TEA) laser structure 10. This laser 10 is made of an outer housing 18 which forms the laser cavity 16 in which the active gases are contained. A pair of electrodes 20 and 22 are mounted in any conventional manner (not shown) within laser cavity 16 at a distance of no more than the maximum Beta particle range apart. It should be noted, however, that for optimum preionization uniformity with this invention the distance between the radioactive sources and the volume to be preionized should be on the order of the mean Beta particle range or less.

In the embodiment shown in FIG. 1 electrode 20 is preferably a Rogowski profile electrode while electrode 22 is conventionally termed a perforated electrode. A platform 24 is secured to the base of housing 18 within laser cavity 16 juxtaposed perforated electrode 22. Mounted on platform 24 is a plurality of radioactive sources 12 and for optimum results this source being pure Beta particle emitters which provide for the preionization of gases 14 within laser cavity 16. In this invention, a 100 microcurie or more Beta emitter such as $^{63}$Nickel on a two inch strip is sufficient to produce ionization levels to $10^6$ ionpairs/cc or better over 2cm above the strip at atmospheric laser gas pressures. Higher energy Beta particle sources such as $^{90}$Strontium can be used to uniformly preionize gases at greater distances, such as 2 meters. This is well above the preionization level necessary for efficient operation in conventional $CO_2$—$N_2$—He TEA lasers and could be used for other lasing gas mixtures and electrically initiated combustion lasers. In sealed laser systems, one of the contained gases could be the radioactive source, such as $^{14}CO_2$ used in a "$CO_2$—$N_2$—He TEA laser.

Marx bank, blumein or any other standard TEA laser discharge circuit 26 can be utilized with the instant invention. This circuit initiates the laser action by a trigger spark gap 28 in conjunction with a high voltage source and resistance 29 in the order of 1 meg$\Omega$, a capacitor 30 of 0.01 $\mu$fd and a resistor 32 of ~10K$\Omega$ as shown in FIG. 1 of the drawing.

Figure 2:
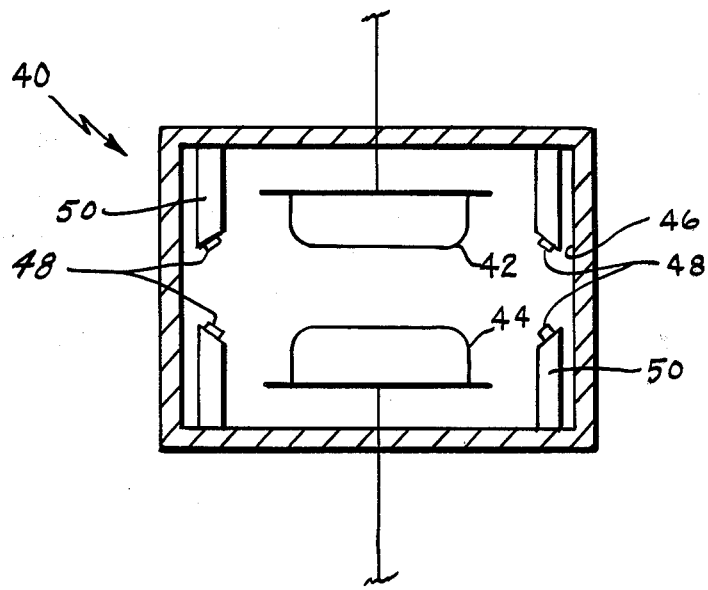
FIG. 2 is a schematic representation of an end view of a modified preionized electrical discharge laser cavity of this invention shown partly in cross-section.

FIG. 2 represents a TEA laser 40 in which the electrodes therein are in the form of a pair of Rogowski profile electrodes 42 and 44, respectively. In this embodiment it is preferable to locate the Beta emitter 48 on raised platforms 50 mounted within laser cavity positioned 46 so that the radioactive emission can take place within the spacing between electrodes 42 and 44. The same discharge circuit 26 utilized with laser 10 shown in FIG. 1 can be utilized with laser 40 shown in FIG. 2.

In using a radioactive source such as Beta particle emitters 12 and 48, as shown in FIGS. 1 and 2, a uniform preionization of the active gases within the laser cavities 16 and 46 can take place without the necessity of any additional electrical apparatus, timing circuits etc. Not only does the simplified system of the instant invention overcome the problems of complex apparatus but this invention provides a uniform preionization and therefore overcomes the problems of non-uniformity heretofore in existence with the complex systems of the past.

Although this invention has been described with reference to particular embodiments it will be understood to those skilled in the art that this invention is also capable of a variety of alternate embodiments within the spirit and scope of the appended claims.

We claim:

1. In a TEA laser having a supporting structure, an active medium located within said supporting structure, a pair of electrodes within said supporting structure forming a waveguide allowing for low loss propagation of laser radiation to be generated within said active medium between said pair of electrodes, and a discharge circuit, the improvement comprising a plurality of platforms mounted within said supporting structure and separated from at least two sidewalls thereof, each of said platforms having a surface thereon for supporting a Beta particle emitter, each of said surfaces being beveled to face in the direction of said electrodes and the region therebetween at least one Beta particle emitter capable of ionizing atmospheric pressure laser gas being mounted on each of said inclined surfaces, the distance between said Beta particle emitters and said active medium between said electrodes being on the order of the mean Beta particle range or less and said electrodes being spaced no greater than the maximum Beta particle range apart from one another for providing a uniform preionization of said active medium within said waveguide by means of Beta particle emission.

2. In a TEA laser as defined in claim 1 wherein each of said electrodes have a Rogowski profile.

\* \* \* \* \*